March 30, 1954  R. W. MANEVAL  2,673,697
AIRCRAFT CONTROL
Filed Aug. 2, 1950  2 Sheets-Sheet 1
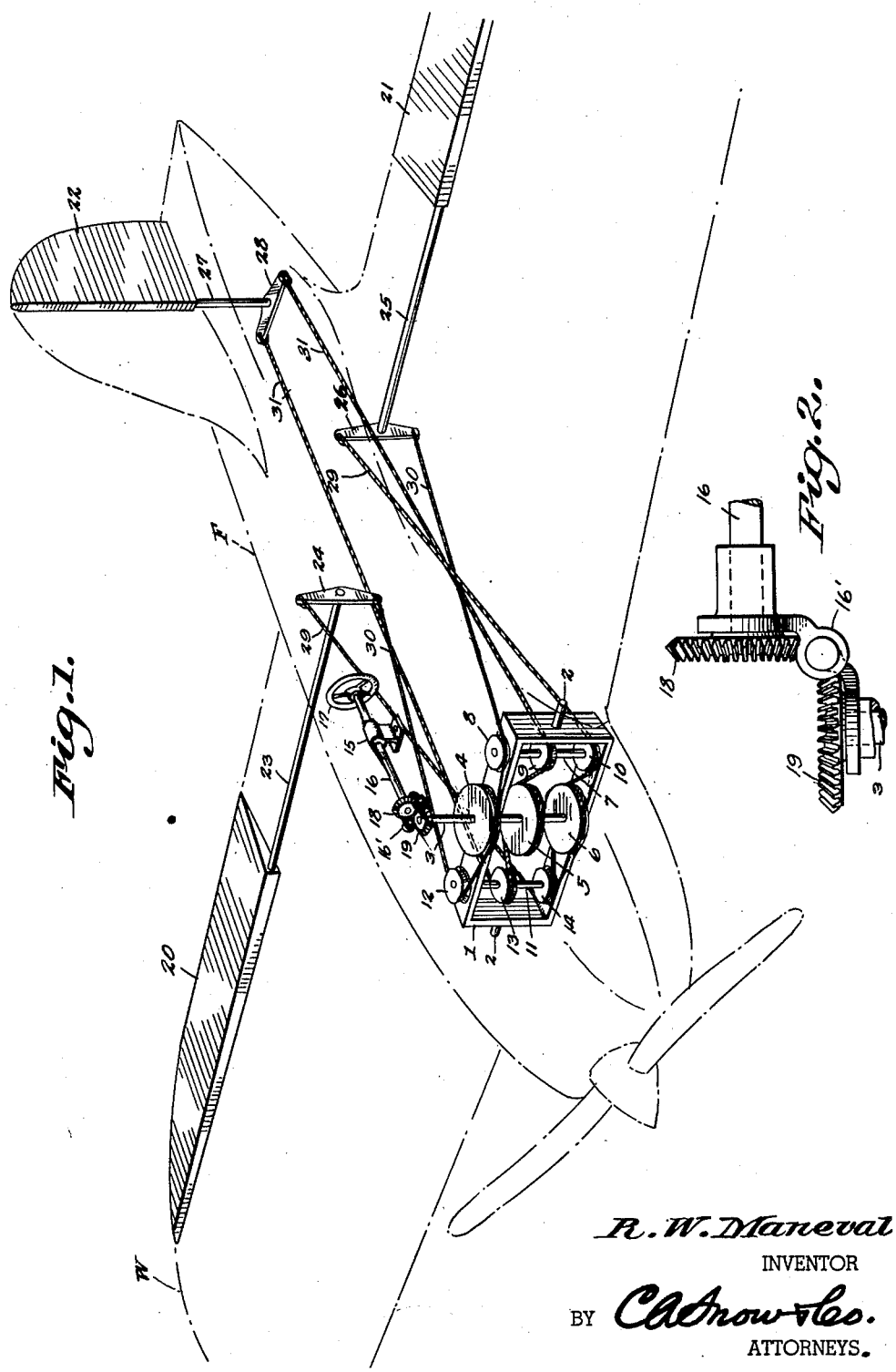
R. W. Maneval
INVENTOR
BY C. A. Snow & Co.
ATTORNEYS.

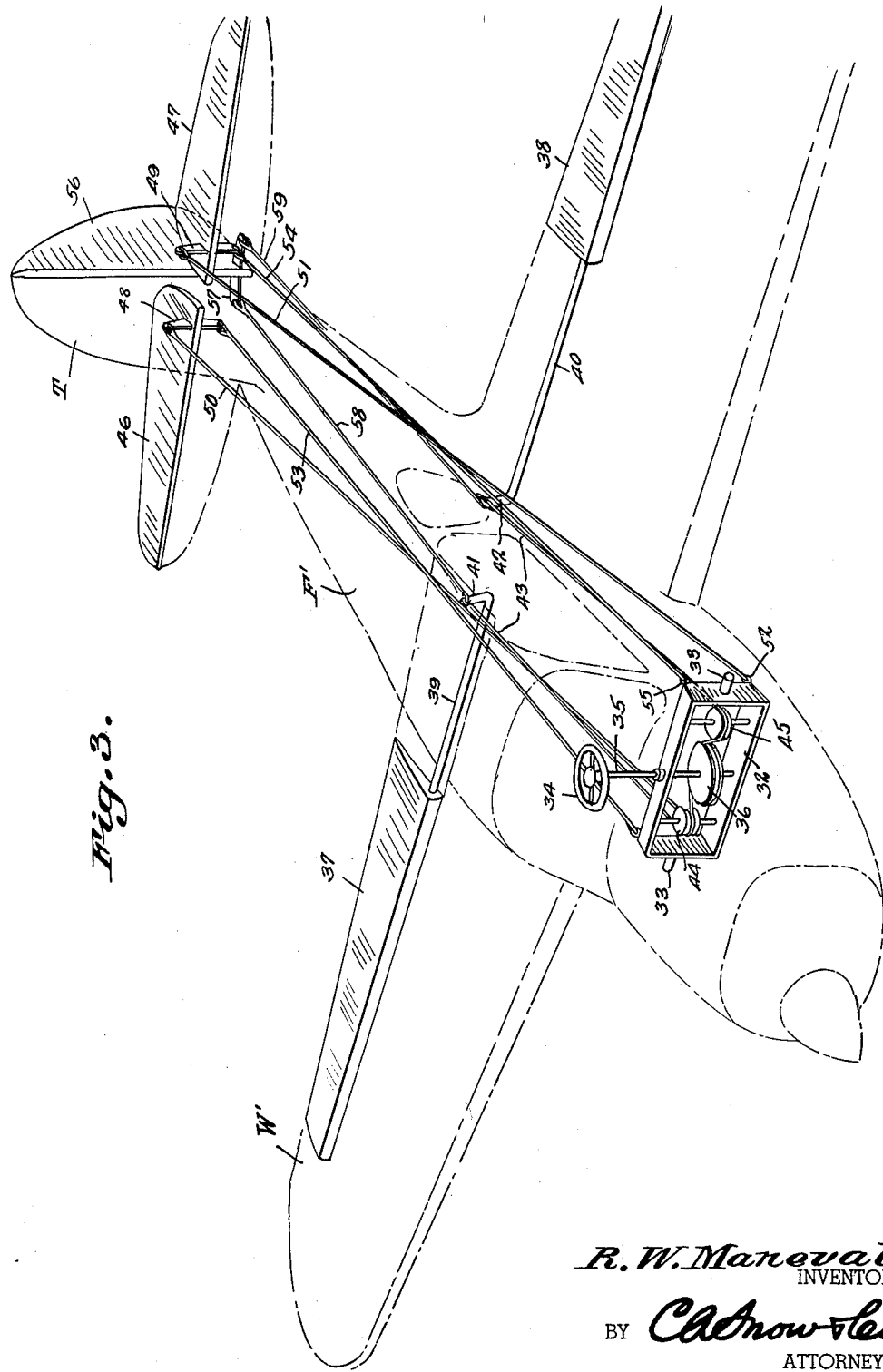

Patented Mar. 30, 1954

2,673,697

UNITED STATES PATENT OFFICE 2,673,697

AIRCRAFT CONTROL

Rex W. Maneval, Frankfort, Kans.

Application August 2, 1950, Serial No. 177,247

3 Claims. (Cl. 244—83)

This invention relates to aircraft controls, and more particularly, has reference to a novel controlling means for operating the several movable control surfaces of an airplane, such as the ailerons, elevators, and rudders.

One important object of the present invention is to provide a control means of the type stated which will provide a direct control surface operation by extending control cables direct to the several surfaces of the aircraft from a central control frame, the construction being such as will allow the cables to be arranged alongside the fuselage and extended directly to said control surfaces, thus to eliminate wheels, devices, and pulleys necessarily used in other aircraft as presently constructed to obtain the same results.

Another important object is to provide a control means for aircraft wherein the several control surfaces are linked for simultaneous operation in a manner to cause desired directional changes in the aircraft movement responsive to simple, single movements of the control wheel by the pilot as distinguished from combination movements heretofore required in many instances.

Still another object is to provide a control means for aircraft of the type stated that can be applied to aircraft of novel design in which only ailerons and rudder are provided, and in which the elevators ordinarily constituting a part of the tail construction of the aircraft are eliminated.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 1 is a perspective view of the aircraft control means constituting the present invention as applied to an aircraft of elevator-less construction, the general outline of the aircraft being dotted in to illustrate the relative position of the control means constituting the present invention in said aircraft.

Fig. 2 is a fragmentary side elevation of a hinged gear connection.

Fig. 3 is a similar view showing a modified form of control means adapted for mounting in an aircraft of low wing conventional present day design.

Referring to the drawings in detail, in Fig. 1 there is illustrated an aircraft of unconventional design which can be said to be tail-less, to the extent that the aircraft is constructed without elevators, and has ailerons and a rudder only so far as movable control surfaces thereof are concerned.

The aircraft includes a fuselage F and a wing W, relatively wide compared to the overall fuselage length. In this connection, the present invention is mainly concerned with the means for controlling the movement of the ailerons and rudder, and is not intended to be concerned with the aircraft design per se or the manner of powering said aircraft.

I provide an open rectangular box frame 1 extending transversely of the aircraft, for substantially the full width of the fuselage F, this box frame 1 having intermediate its horizontal top and bottom rails the trunnions 2 extending from the opposite sides of the box frame, these trunnions 2 being journaled in opposite sides of the fuselage frame.

The frame 1 is thus mounted for oscillating or rockable movement, rocking upon a horizontal axis disposed transversely of the aircraft fuselage F, said axis being centrally located between the top and bottom ends of the frame.

Located centrally between the opposite sides of the frame 1, and extending from top to bottom of the frame is a main control shaft 3, journaled in the top and bottom portions of the frame, said shaft being perpendicular to the axis on which the frame 1 rocks.

Fixed to the shaft 3 adjacent the upper end of said shaft is an upper main control disc 4, disposed immediately above the top portion of the frame 1, while a medial control disc 5 is fixed to the shaft intermediate the top and bottom portions of the frame, in the plane of the axis on which the frame rocks. A lower main control disc 6 is also rigid with the shaft 3 at the bottom of the shaft, this being located immediately above the bottom portion of the frame 1. These control discs are relatively large in size in the present instance, as compared to right and left secondary control discs to be described immediately hereinafter.

Referring to said secondary control discs, a secondary shaft 7 is mounted in the top and bottom portions of the frame and extends therebetween, this being parallel to the shaft 3 and having rotatable thereon the upper secondary control disc 8, the medial disc 9, and the lower disc 10. At the opposite side of the frame the construction is duplicated, there being a shaft 11 having rotatable thereon discs 12, 13, and 14 respectively.

A bearing 15 is to be connected rigidly with the frame of the fuselage F, the rigid connection not being shown in the present instance.

Journaled in the bearing bracket 15 is the operating shaft 16 controlled by the pilot by means of a control wheel 17. At the inner end of the shaft 16 is a beveled gear 18 meshing with a beveled gear 19 on the top end of the shaft 3. These beveled gears are held in mesh by a hinged collar bearing 16' with hinges in a line with the gear teeth and this permits the forward and rearward movement of shaft 16 through the bearing 15.

In the illustrated example of the aircraft, the wings W are equipped at opposite ends with the ailerons 20 and 21 respectively, while the tail of the aircraft is equipped with the vertically disposed rudder 22. A spindle 23 is rigidly secured in any suitable manner to the leading edge of the aileron 20, and extends from the aileron to one side of the fuselage F, said spindle 23 being secured to the medial portion of a rocking arm 24, the oscillating or rocking arm 24 being adapted to rock the spindle 23 in one direction or the other, depending on whether the top or bottom end of the arm 24 is pulled. In this manner the ailerons 20 and 21 are swung upwardly or downwardly, depending upon whether the aircraft is to be given ascending or descending movement.

The aileron 21 is similarly equipped with a spindle 25 extending to the adjacent side of the fuselage F and rigidly secured to the medial portion of an oscillating control arm 26.

The rudder 22 has its leading edge rigid with a downwardly extending spindle 27 secured to the medial portion of a horizontally disposed oscillating arm 28.

One end of a control cable 29 is secured to the upper end of the oscillating arm 26, said control cable 29 being extended from said oscillating arm to the disc 10 and being passed around said disc to the disc 6. The cable 29 is looped fully around the disc 6 and thence is passed around the disc 14, the other end of the cable 29 being secured to the upper end of the other aileron control arm 24. A cable 30 is secured at one end to the bottom end of the control arm 26 and thence passed around the disc 8, disc 4, disc 12, to the lower end of the arm 24. A rudder control cable 31 is secured at one end to one end of the control arm 28, said cable 31 being passed around the pulley 9, after which it is looped fully around the medial main control disc 5, being then passed around the disc 13 and being secured at its other end to the other end of the arm 28.

Considering now the operation of the control means, it will be assumed that the pilot desires to make a left turn. He accordingly turns the control wheel 17 to the left or counterclockwise. This imparts rotation to the shaft 3 in one direction, which rotates with it the three main control discs and, through the medium of the three cables looped around said control discs, the six secondary control discs.

As a result, in making the left turn, pull is set up upon the lower end of the oscillating aileron control arm 24, by the cable 30. Simultaneously pull is set up upon the upper end of the control arm 26 by one end of the cable 29. The other ends of the cables 29 and 30 are of course allowed to move with the rearwardly swinging other ends of the control arms 24 and 26.

Simultaneously with these movements, pull is set up upon the right hand end of the rudder control arm 28 as seen in Fig. 1.

The net result is to give all the movable control surfaces the desired movements to effect a banked left turn. All this is achieved, of course, by the single movement imparted to the control wheel 17 by the pilot. In the event the pilot desires to impart climbing movement to the aircraft, he simply pulls rearwardly upon the control wheel 17, as a result of which, through the medium of the rigid connections between the bracket 15 and frame 1, the top end of the frame is rocked rearwardly while the bottom end is rocked forwardly. This sets up pull upon both ends of the cable 29, so that the upper ends of the control arms 24 and 26 are pulled forwardly at the same time, thus to elevate the ailerons and impart the desired climbing movement to the aircraft. To impart descending movement to the craft, the pilot pushes forwardly upon the control wheel 17, and the reverse movement is given to the ailerons, by pulling upon both ends of the cable 30 simultaneously.

Of course, it is readily possible to give climbing or descending movement to the aircraft while at the same time making a right or left turn, by pulling back or pressing forward upon the wheel 17 while at the same time turning it to right or left as desired.

Important advantages reside in the construction illustrated, in that a minimum of special devices for transmitting the controlled movement to the surfaces are eliminated, and all cables extend along opposite sides of the fuselage in locations where they are fully out of the way. This is readily achieved by the particular formation of the rockable supporting frame 1, with the control cables being led to the opposite sides of the frame and being thereafter led directly to the individual control surfaces.

Referring now to Fig. 2, a more or less conventionally designed aircraft is illustrated having the fuselage F' and wing W' and tail T. In this instance a rectangular frame is provided that is designated 32, this being formed with the trunnions 33 journaled in opposite side portions of the fuselage frame. A control wheel 34 rotates the main shaft 35 having the main control disc or pulley 36.

The ailerons are designated 37 and 38 respectively and are rigid with the spindles 39 and 40 formed at their inner ends with the oscillating arms 41 and 42. To the upper end of the arm 41 is connected one end of a cable 43 that is passed around the side pulley 44 and is thereafter looped around the main pulley 36 and fastened to eliminate slippage of cable. The cable 43 is then trained around the opposite side pulley 45 and is extended rearwardly for connection to the top end of the other aileron control arm 42.

The two elevators are designated 46 and 47 respectively and are provided with the control arms 48 and 49. To the upper end of the arm 48 is connected one end of a cable 50, which is then extended along one side of the fuselage F' and is connected directly to one of the bottom corners of the frame 32. A cable 51 is connected to the upper end of the other elevator control arm 49 and this is extended along the opposite side of the fuselage F' and is connected as at 52 to the other bottom corner of the frame 32.

A cable 53 is connected to the lower end of the elevator control arm 48 and is extended forwardly along one side of the fuselage F' to the frame 32, where it is connected directly to one of the upper corners. A cable 54 is connected to the lower end of the other elevator control arm 49 and is extended along the opposite side of the fuselage F' and is connected as at 55 to the other upper corner of the frame 32.

From this, it will be seen that if the pilot presses forwardly upon the control wheel 34, the upper end of the frame 32 is rocked forwardly upon the trunnions 33, setting up pull upon the cables 53 and 54, thus to lower the elevators 46 and 47 and give the aircraft descending movement. If the pilot pulls rearwardly upon the control wheel 34, the opposite effect is had, and the elevators 46 and 47 are raised so as to impart to the aircraft climbing movement.

The rudder of the aircraft is designated 56, and this is rigid with a rudder control arm 57 disposed horizontally and adapted to impart to the rudder 56 swinging movement through a horizontal plane, by setting up pull upon one end or the other of said arm 57.

To one end of the rudder control arm 57 is connected one end of a cable 58 that is extended along one side of the fuselage F' and is secured to the arm 41. To the other end of said arm 57 is secured a cable 59 extending along the opposite side of the fuselage and connected to the arm 42.

Considering the embodiment illustrated in Fig. 3, again it is to be noted that the invention includes the transversely extended rockable frame extending fully from side to side of the fuselage of the aircraft, and journaled for rocking movement in the opposite sides of the aircraft fuselage frame, the control cables extending from the center to opposite sides of the fuselage, where they are fully out of the way and from which point they can extend to the control surfaces.

It will further be noted that in operation of the controls of Fig. 3, straight ascending or descending movement, that is, the making of such movements without left or right turns at the same time, is achieved by pulling back upon the control wheel 34 or moving said wheel forwardly, as the case may be. This rocks the frame 32. When the frame is rocked forwardly at its upper end, pull is set up upon the cables 53 and 54, lowering the elevators 46 and 47 and imparting descending movement to the aircraft. At the same time slack occurs in the cables 50 and 51 to permit said lowering of the elevators.

It will be understood that when ascending movement is to be given the aircraft, the opposite is true.

Assuming that it is desired to make a left turn the operator turns the control wheel counterclockwise and this sets up pull upon that end of cable 43 that is connected to the arm 42 of aileron 38. This elevates aileron 38. At the same time the other aileron 37 is dropped. In this connection, when the pull is set up upon the arm 42, pull will be set up upon the rudder control cable 59, so that the rudder pivots to the left in Fig. 2 to accomplish the left turn.

It is to be noted that when the rudder 56 pivots to the left in Fig. 3, it will set up a pull to the rear upon the cable 58, which in turn pulls rearwardly upon the arm 41 thus to drop the aileron 37 simultaneously with elevation of the aileron 38.

In the illustrated embodiments of the invention, in each instance the system has been illustrated as a single control, including a single centrally disposed main control shaft 3 or 35, as the case may be. However, this illustration has been confined to a single control purely for the sake of simplicity and to illustrate the basic construction. I believe it will be sufficiently apparent as not to require special illustration that where the aircraft is to be of the dual control type, instead of one main control shaft 3 and associated pulleys 4, 5, and 6, there would be two placed side by side, with the control cables passing successively around the pulleys of both so as to link them in tandem for simultaneous operation, as would be desirable, for instance, where one is receiving flying instructions.

What is claimed is:

1. An aircraft control means for moving the various control surfaces of an airplane including ascent and descent control surfaces and a rudder comprising an open frame extending transversely of an aircraft fuselage, the sides of the frame being mounted in the airplane fuselage, trunnions disposed centrally between the top and bottom ends of the frame and journalled in opposite sides of said fuselage, at least one main control shaft extending vertically of the frame centrally between the opposite sides of the frame, a plurality of main control pulleys fixed to said shaft for rotation therewith, said pulleys being spaced vertically on the shaft for rotation in parallel horizontal planes, secondary pulleys disposed adjacent opposite sides of the frame parallel to and in horizontal alignment with said main pulleys, a plurality of cables passed around the main pulleys and the secondary pulleys and connected respectively with the various control surfaces of said aircraft, those cables extending to the climb and descent control surfaces of the aircraft being disposed above and below the horizontal plane of one of said main pulleys, another cable extending to the rudder surface of the aircraft being disposed substantially in the plane parallel to the horizontal plane of said one main pulley and means under the control of an operator for rotating the main shaft.

2. An aircraft control means for moving the various control surfaces of an airplane including ascent and descent control surfaces and a rudder surface comprising an open box frame disposed transversely of an aircraft fuselage and pivotally mounted therein and including trunnions extending laterally from opposite sides thereof and journalled in opposite sides of the fuselage for movement on a horizontal axis, said trunnions being located centrally between the top and bottom ends of the frame, at least one main control shaft journalled in the frame and disposed perpendicular to the horizontal axis of said trunnion, said main control shaft being located centrally between the opposite sides of the frame, means under the control of an operator for pressing forward upon said main control shaft or pulling rearwardly thereon to impart rocking movement to said frame, a plurality of vertically spaced control pulleys rigid with said shaft, one at least of said pulleys being disposed in the plane of said horizontal axis, secondary control pulleys spaced vertically of the frame and rotatably mounted in the frame adjacent the opposite sides thereof, a plurality of cables passed around the control pulleys and secondary pulleys and extending to said various controls surfaces of the aircraft, the cable passed around said pulleys and being located in the plane of said horizontal axis extending to the rudder surfaces and the other cables extending to the other control surfaces of the aircraft.

3. An aircraft control device for moving the various surfaces of an aircraft, said surfaces including ascent and descent control surfaces and a rudder, a frame pivotally mounted in the airplane fuselage and adapted for tilting movement about a horizontal axis, said frame including trunnions and a vertically disposed main control shaft carried by said frame, a plurality of main control pulleys fixed to said main shaft so as to rotate therewith, additional auxiliary shafts carried by said frame and disposed parallel to said main shaft, auxiliary pulleys fixed to said auxiliary shaft, a plurality of cables extending around said main and auxiliary pulleys and connected with said main and auxiliary pulleys and with said various control surfaces and said rudder respectively, those cables not operating said ascent and descent control surfaces being disposed above and below said horizontal axis and the cable for operating said rudder being disposed in a plane of said horizontal axis and means for actuating said main shaft and cables thereto connected so as to control the ascent and descent of the aircraft and the rudder with maximum safety.

REX W. MANEVAL.

References Cited in the file of this patent

UNITED STATES PATENTS

| Number | Name | Date |
|---|---|---|
| 1,293,160 | Miller | Feb. 4, 1919 |

FOREIGN PATENTS

| Number | Country | Date |
|---|---|---|
| 838,630 | France | Dec. 16, 1938 |